(12) United States Patent
Furutani et al.

(10) Patent No.: US 7,711,389 B2
(45) Date of Patent: May 4, 2010

(54) HIGH FREQUENCY MODULE

(75) Inventors: Koji Furutani, Moriyama (JP); Shinya Watanabe, Yasu (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 358 days.

(21) Appl. No.: 10/595,782

(22) PCT Filed: Oct. 21, 2004

(86) PCT No.: PCT/JP2004/015611

§ 371 (c)(1),
(2), (4) Date: Oct. 9, 2008

(87) PCT Pub. No.: WO2005/046070

PCT Pub. Date: May 19, 2005

(65) Prior Publication Data

US 2009/0075604 A1 Mar. 19, 2009

(30) Foreign Application Priority Data

Nov. 11, 2003 (JP) .............................. 2003-381087

(51) Int. Cl.
*H04M 1/00* (2006.01)
(52) U.S. Cl. .................... 455/552.1; 455/78; 455/80; 455/83; 455/275; 455/553.1; 455/550.1; 455/273; 333/185; 333/175; 333/134; 333/103; 333/104
(58) Field of Classification Search .............. 455/552.1, 455/83, 78, 80, 275, 273, 553.1, 550.1
See application file for complete search history.

(56) References Cited

U.S. PATENT DOCUMENTS 5,436,601 A  7/1995 Mandai et al.

(Continued)

FOREIGN PATENT DOCUMENTS

JP  10-12490 A  1/1998

(Continued)

OTHER PUBLICATIONS

Official communication issued in counterpart Chinese Application No. 2004800318131, mailed on October 31, 2008.

(Continued)

*Primary Examiner*—Marceau Milord
(74) *Attorney, Agent, or Firm*—Keating & Bennett, LLP

(57) ABSTRACT

A high frequency module for transmitting and receiving, for example, communication signals of GSM/DCS/PCS/WCDMA systems through a single antenna, is provided at a relatively small size and low cost. The high frequency module includes a diplexer arranged to separate communication signals from the antenna into GSM communication signals in lower frequency bands and POS/DOS/WODMA communication signals in higher frequency bands, a diode switch circuit that is connected to a input and output terminal of the GSM communication signal of the diplexer and is arranged to switch transmission and reception of the GSM communication signal, and a multipoint GaAsIC switch that is connected to the GSM/DCS/PCS/WCDMA communication signals of the diplexer and is arranged to switch transmission and reception of these signals. The high frequency module switches the four types of communication signals by changing the patterns of controls signals VcG, VC1, and Vc2 that are applied to the diode switch circuit and the GaAsIC switch.

6 Claims, 6 Drawing Sheets

U.S. PATENT DOCUMENTS

| | | | | |
|---|---|---|---|---|
| 5,668,511 | A | 9/1997 | Furutani et al. | |
| 6,504,452 | B2 * | 1/2003 | Takada et al. | 333/185 |
| 6,633,748 | B1 * | 10/2003 | Watanabe et al. | 455/78 |
| 6,642,812 | B2 * | 11/2003 | Kariya et al. | 333/185 |
| 6,788,958 | B2 * | 9/2004 | Furutani et al. | 455/552.1 |
| 6,847,269 | B2 * | 1/2005 | Watanabe et al. | 333/126 |
| 6,987,984 | B1 * | 1/2006 | Kemmochi et al. | 455/552.1 |
| 7,003,312 | B2 * | 2/2006 | Kemmochi et al. | 455/552.1 |
| 7,026,887 | B2 * | 4/2006 | Watanabe et al. | 333/126 |
| 7,155,197 | B2 * | 12/2006 | Furutani | 455/349 |
| 7,200,365 | B2 * | 4/2007 | Watanabe et al. | 455/82 |
| 7,239,851 | B2 * | 7/2007 | Kosemura et al. | |
| 7,253,702 | B2 * | 8/2007 | Kemmochi et al. | 333/133 |
| 7,356,349 | B2 * | 4/2008 | Furutani et al. | 455/552.1 |
| 7,373,171 | B2 * | 5/2008 | Nakai | 455/552.1 |
| 7,398,103 | B2 * | 7/2008 | Furutani et al. | 455/552.1 |
| 2003/0092397 | A1 | 5/2003 | Uriu et al. | |
| 2003/0181167 | A1 | 9/2003 | Iida | |
| 2004/0266378 | A1 | 12/2004 | Fukamachi et al. | |

FOREIGN PATENT DOCUMENTS

| | | |
|---|---|---|
| JP | 2000-165288 A | 6/2000 |
| JP | 2001-044884 A | 2/2001 |
| JP | 2001-160724 A | 6/2001 |
| JP | 2002-246942 A | 8/2002 |
| JP | 2002-540664 A | 11/2002 |
| JP | 2003-101436 A | 4/2003 |
| JP | 2003-133989 A | 5/2003 |
| JP | 2003-209454 A | 7/2003 |

OTHER PUBLICATIONS

Official communication issued in counterpart Chinese Application No. 2004800318131, mailed on May 8, 2009.

Official communication issued in the counterpart Japanese Application No. 2005-515253, mailed on July 26, 2007.

Official communication issued in the counterpart Japanese Application No. 2005-515253, mailed on October 23, 2007.

International Search Report issued in the corresponding International Application No. PCT/JP2004/015611, mailed on Feb. 1, 2005.

* cited by examiner ary skills in the art from this description of preferred embodiments of the present invention with reference to the attached drawings.

HIGH FREQUENCY MODULE

BACKGROUND OF THE INVENTION

1. Field of the Invention

The present invention relates to high frequency modules for transmitting and receiving transmission and reception signals of at least four communication systems having different frequency bands as transmission and reception bands through a single antenna.

2. Description of the Related Art

Currently, multiple wireless communication systems for mobile phones, such as a CDMA system and a TDMA system, exist. The TDMA system includes for example, a GSM system using an 850 MHz band and a 900 MHz band, a DCS system using a 1,800 MHz band, and a PCS system using a 1,900 MHz band, whereas, the CDMA system includes, for example, a WCDMA system using a 2,000 MHz band.

When transmitting and receiving such multiple types of communication signals with a single antenna, the signals other than those in the frequency band used for the actual communication is not needed. For example, when carrying out transmission and reception using the GSM system (900 MHz band), the communication signals for the DCS system (1,800 MHz band) and the PCS system (1,900 MHz) and the communication signals for the WCDMA system (2,000 MHz) are not needed.

As a high frequency module for transmitting and receiving multiple types of communication signals through a single antenna when the communication signals are according to, for example, three types of systems, GSM, DCS, and PCS, a high frequency module including a diplexer for separating the GSM communication signals and the DCS and PCS communication signals that are in significantly different frequency bands, a diode switch circuit for switching between the GSM transmission signals and the GSM reception signals, a diode switch circuit for switching between the DCS and PCS transmission signals and the DCS and PCS reception signals, and a diode switch circuit for switching between the DCS reception signals and the PCS reception signals has been proposed (for example, refer to Japanese Unexamined Patent Application Publication No. 2000-165288).

As such a high frequency module for transmitting and receiving multiple types of communication signals through a single antenna, a high frequency module capable of selecting each communication signal using a semiconductor switch, such as a GaAsIC switch and switching the connection between a plurality of ports for an antenna has been proposed (for example, refer to Japanese Unexamined Patent Application Publication No. 2001-160724).

However, the diode switch circuit for the high frequency module according to the above-mentioned Japanese Unexamined Patent Application Publication No. 2000-165288 uses two diodes to switch between two ports (input unit and output unit) corresponding to one port (input and output unit). For example, according to Japanese Unexamined Patent Application Publication No. 2000-165288, the diode switch circuit (high frequency switch 3 shown in a drawing of Japanese Unexamined Patent Application Publication No. 2000-165288) switches the connection between a port that connects to a diplexer and inputs and outputs DCS and PCS transmission and reception signals, and a port that connects to a PCS and DCS transmission signal input terminals and inputs DCS and PCS transmission signals or that connects to another diode switch circuit (high frequency switch 4 shown in a drawing of Japanese Unexamined Patent Application Publication No. 2000-165288) and outputs DCS and PCS reception signals. The diode switch circuit (high frequency switch 4 shown in a drawing of Japanese Unexamined Patent Application Publication No. 2000-165288) is connected to another diode switch circuit (high frequency switch 3 shown in a drawing of Japanese Unexamined Patent Application Publication No. 2000-165288) and switches the connection between and a port for inputting DCS and PCS reception signals and a port for outputting a PCS reception signal connected to a PCS reception signal output terminal or a port for outputting a DCS reception signal connected to a DCS reception signal output terminal. Since, in this way, the high frequency module according to Japanese Unexamined Patent Application Publication No. 2000-165288 requires at least two diodes to switch the connection between one port and two ports, many circuit components are required to construct a high frequency module for switching between transmission and reception of communication signals of a plurality of communication systems.

Therefore, it is difficult to reduce the size of the high frequency module, and costs increase because of an increase in the number of components. Since, in this way, many circuit elements are connected to the transmission system, the loss of the transmitted signal increases. Since the loss significantly increases as the number of types of the communication system for transmitting the signal increases, it is difficult to construct a high frequency switch for switching the transmission of signals of many different types of communication systems so that the high frequency switch has low loss.

On the other hand, since the high frequency module according to Japanese Unexamined Patent Application Publication No. 2001-160724 is capable of switching signals of many types of communication systems using one GaAsIC switch, a small-size, low-loss high frequency module is realized. However, GaAs is expensive, and, in particular, the price increases as the number of switching points of a GaAsIC increases since the scale of the circuitry increases. Moreover, GaAs is susceptible to static electricity. Therefore, when using such an IC, a separate circuit must be provided as a counter measure against static electricity. As a result, if a high frequency module is constructed using a multipoint GaAsIC for switching signals of many types (for example, more than four types) of communication systems, cost significantly increases and size cannot be decreased because an additional circuit is required.

SUMMARY OF THE INVENTION

According to preferred embodiments of the present invention, a high frequency module being capable of transmission and reception for many types, e.g., more than four types, of communication systems and having a relatively small size is provided at low cost.

A high frequency module according to a preferred embodiment of the present invention preferably includes a diplexer arranged to separate signals of a plurality of communication systems transmitted and received via an antenna, the communication systems having transmission and reception bands of different frequency bands, the signals of a plurality of communication systems being separated into a signal of a first communication system having a transmission and reception band in an area higher than a predetermined frequency and a signal of a second communication system having a transmission and reception band in an area lower than a predetermined frequency, a first switch circuit arranged to switch transmission and reception of the signal of the second communication system having a transmission and reception band in a lower area, and a second switch circuit arranged to switch transmission and reception of the signal of the first communication system having a transmission and reception band in a higher area. The diplexer, the first switch circuit, and the second switch circuit preferably include electrodes provided on a laminated body constructed by stacking a plurality of dielectric layers and components mounted on the laminated body. The diplexer includes a low pass filter allowing the signal of the second communication system having a transmission and reception band in an area lower than a predetermined frequency to pass through and a high pass filter for allowing the signal of the first communication system having a transmission and reception band in an area higher than a predetermined frequency to pass through. The first switch circuit includes a first transmission and reception signal input and output unit connected to the low pass filter of the diplexer and configured to output a predetermined transmission signal of the second communication system having a transmission and reception band in a lower area and to input a predetermined reception signal, a first transmission signal input unit for inputting the transmission signal, a first reception signal output unit for outputting the reception signal, and a diode for switching the connection between the first transmission and reception signal input and output unit and one of the first transmission signal input unit and the first reception signal output unit in accordance with a control signal. The second switch circuit includes a second transmission and reception signal input and output unit connected to the high pass filter of the diplexer and configured to output a predetermined transmission signal of the first communication system having a transmission and reception band in a higher area and to input a predetermined reception signal, a second transmission signal input unit arranged to input the transmission signal, a second reception signal output unit arranged to output the reception signal, and a FET switch element arranged to switch the connection between the second transmission and reception signal input and output unit and one of the second transmission signal input unit and the second reception signal output unit in accordance with a control signal. The high pass filter includes a first capacitive element connected between the antenna and the second switch circuit and a series circuit including a dielectric element and a second capacitive element, the series circuit being connected between the second switch side of the first capacitive element and the ground. The second capacitive element includes a ground electrode provided on a dielectric layer close to the bottom surface of the laminated body and an electrode opposing the ground electrode.

The diplexer of the high frequency module according to a preferred embodiment of the present invention separates signals of at least four communication systems into a signal of a first communication system having a transmission and reception band in an area higher than a predetermined frequency and a signal of a second communication system having a transmission and reception band in an area lower than a predetermined frequency.

The FET switch element of the high frequency module according to a preferred embodiment of the present invention is preferably a GaAs switch.

With such a unique structure, a diplexer passes a communication signal received by an antenna in a communication frequency band in an area higher than a predetermined frequency through a high pass filter and sends the communication signal from a GaAs switch element, which is an FET switch element, to a second switch circuit side. The diplexer passes a communication signal received by the antenna in a communication frequency band in an area lower than a predetermined frequency through a low pass filter and sends the communication signal to a first switch circuit including a diode switch circuit. By applying a control signal to the diode, the first switch circuit switches between the transmissions of a transmission signal of the communication signal in a communication frequency band in an area lower than a predetermined frequency and the transmission of a reception signal. On the other hand, by applying a control signal to the GaAs switch element of the second switch circuit, the transmissions of a transmission signal of the communication signal in a communication frequency band in an area higher than a predetermined frequency and the transmission of a reception signal are switched. In this way, for communication signals in an area lower than a predetermined frequency, a diode switch switches between a transmission signal and a reception signal, whereas, for a plurality of communication signals in an area higher than a predetermined frequency, GaAs switch element switches transmission and reception. Accordingly, the number of components required is reduced compared to when the module is entirely constituted of diode switches, and the number of switching points of the GaAs switch is reduced. Furthermore, by providing a capacitive element connected between the transmission system constituting the high pass filter of the diplexer and the ground by using a ground electrode provided near the bottom surface of a laminated body constituting the high frequency module and an opposing electrode, the capacitive element will function as a static electricity discharge element. Therefore, static electricity can be prevented from being applied from the antenna to the GaAs switch via the diplexer.

If a plurality of communication signals in a communication frequency band in a lower area exists, the number of diode switches can be increased with respect to the number of the communication signals so as to correspond to the selection number of the communication signals. Similarly, if even more communication signals in a communication frequency band in a higher area exist, the number of selection points of the GaAs can be increased with respect to the number of the communication signals so as to correspond to the selection number of the communication signals.

The high frequency module according to a preferred embodiment of the present invention includes a low pass filter having a third capacitive element and a second dielectric element between a diplexer and a second switch circuit.

According to this unique structure, the low pass filter damps higher harmonic waves superimposed on the signal sent from the diplexer to the second switch circuit and higher harmonic waves superimposed on the signal sent from the second switch circuit to the diplexer.

The high frequency module according to a preferred embodiment of the present invention includes a low pass filter having fourth capacitive element and a third dielectric element at the transmission signal input unit side of a second switch circuit.

According to this unique structure, the low pass filter damps higher harmonic waves superimposed on the transmission signal sent from the transmission signal input unit to the second switch circuit.

The second dielectric element and the third dielectric element of the high frequency module according to a preferred embodiment of the present invention are provided in different areas when viewed from the top.

According to this unique structure, since the dielectric elements are disposed more than a predetermined distance apart, wraparound caused by the dielectric elements being coupled can be prevented.

According to various preferred embodiments of the present invention, transmission and reception of a communication signal in an area lower than a predetermined frequency is switched using a diode switch circuit, whereas transmission and reception of a communication signal in an area higher than a predetermined frequency is switched using a FET switch. In this way, the number of components required can be reduced compared to a device that is entirely constructed of diode switch circuits. Moreover, the number of elements disposed on the transmission lines is reduced. Thus, communication signals can be transmitted at low loss. In other words, a low-loss, small high frequency module can be provided. By providing one of the electrodes of the second capacitive element of the diplexer as a ground electrode disposed near the bottom surface of the laminated body, the second capacitive element will function as a static electricity discharge element. Therefore, even when static electricity is applied through the antenna, the static electricity is not applied to the FET switch. In this way, the FET switch can be prevented from being damaged by static electricity.

Other features, elements, steps, characteristics and advantages of the present invention will become more apparent from the following detailed description of preferred embodiments of the present invention with reference to the attached drawings.

DETAILED DESCRIPTION OF PREFERRED EMBODIMENTS

A high frequency module according to a first preferred embodiment of the present invention will be described with reference to FIGS. 1, 2, and 3.

Figure 1:
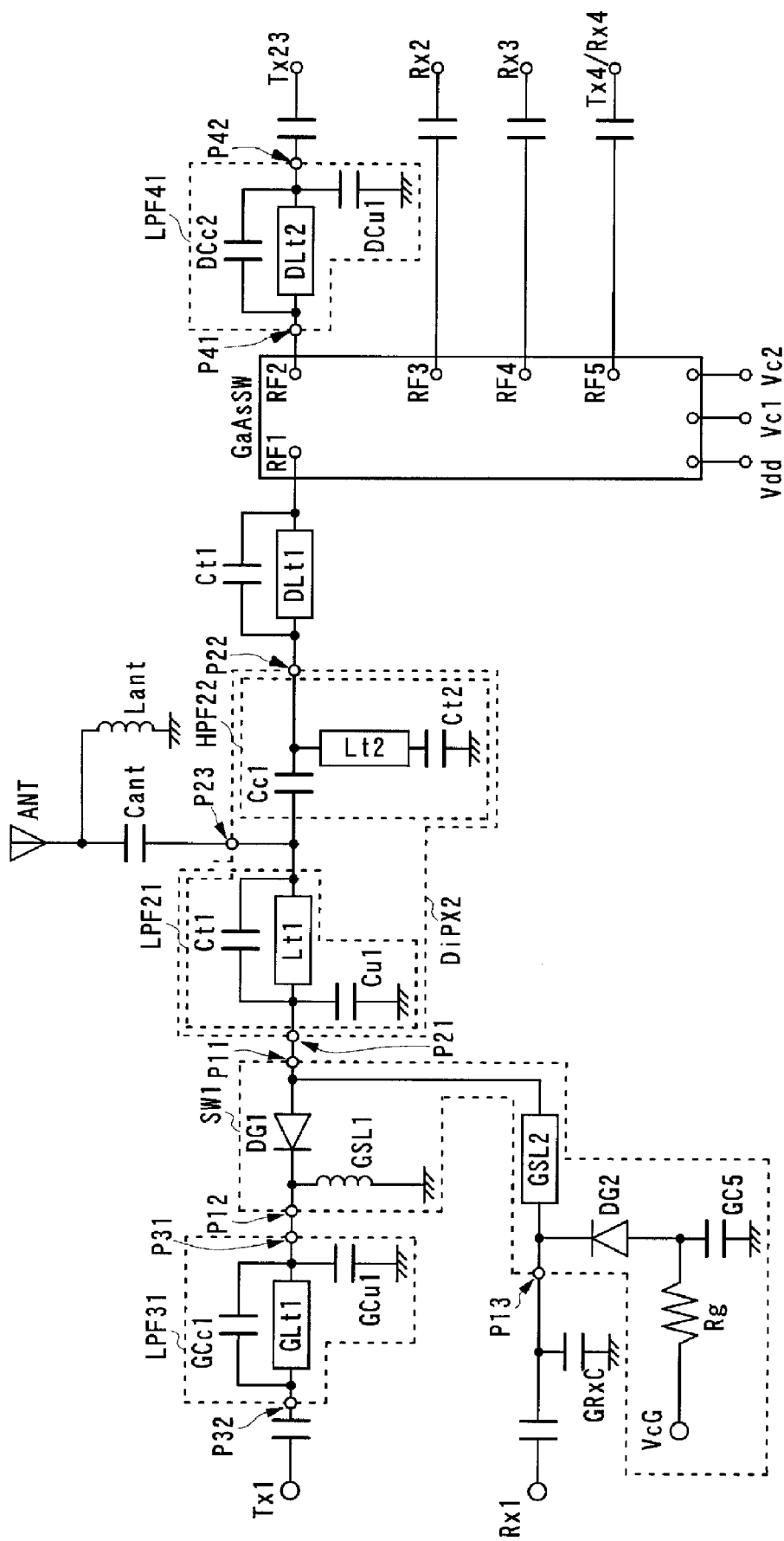
FIG. 1 illustrates an equivalent circuit diagram of a high frequency module according to a first preferred embodiment of the present invention.

FIG. 1 illustrates an equivalent circuit diagram of a high frequency module according to the present preferred embodiment. In the case described below, a GSM transmission signal is input in a transmission signal input terminal Tx1, a GSM reception signal is output from a reception signal output terminal Rx1, a DCS transmission signal or a PCS transmission signal is input in a transmission signal input terminal Tx23, a DCS reception signal is output from a reception signal output terminal Rx2, a PCS reception signal is output from a reception signal output terminal Rx3, and WCDMA transmission and reception signals are input to and output from a transmission and reception signal input and output terminal Tx4/Rx4.

A diplexer DiPX2 preferably includes three input and output units P21 to P23. The input and output unit P21 on a switch circuit SW1 side is connected to the input and output unit P23 on an antenna ANT side via a low pass filter LPF21, whereas the input and output unit P23 is connected to the input and output unit P22 connected to a GaAsIC switch (GaAsSW) via a high pass filter HPF22. A capacitor Cant is connected between the input and output unit P23 of the diplexer DiPX2 and the antenna ANT. The antenna side of the capacitor Cant is connected to ground via an inductor Lant. More specifically, the shunt-grounded inductor Lant and the capacitor Cant constitute the high pass filter. In this way, static electricity that enters from the antenna can be removed at the high pass filter. Here, the low pass filter LPF21 is set so that signals in frequency bands lower than a predetermined frequency (for example, 1,000 MHz) pass through, whereas the high pass filter HPF22 is set so that signals in frequency bands higher than a predetermined frequency pass through.

The low pass filter LPF21 includes a parallel circuit of a capacitor Ct1 and an inductor Lt1 connected between the input and output unit P21 and the input and output unit P23 and a capacitor Cu1 connected between the input and output unit P21 side of the parallel circuit and the ground. The high pass filter HPF22 includes a series circuit of a capacitor Cc1 connected in series between the input and output unit P22 and the input and output unit P23 and a capacitor Ct2 and an inductor Lt2 connected between the input and output unit P22 side of the capacitor Cc1 and the ground. Here, the series circuit is configured such that the capacitor Ct2 is connected to the ground side and the inductor Lt2 is connected to the capacitor Cc1 side. As described below, the inductors Lt1 and Lt2 and the capacitors Ct1, Cu1, Cc1, and Ct2 are constituted of electrode patterns provided on each dielectric layer of a laminated body constituting the high frequency module, i.e., provided inside the laminated body. Here, the capacitor Cc1 corresponds to a "first capacitive element" according to various preferred embodiments of the present invention, the inductor Lt2 corresponds to an "inductive element" according to various preferred embodiments of the present invention, and the capacitor Ct2 corresponds to a "second capacitive element" according to various preferred embodiments of the present invention.

Next, the switch circuit SW1 includes an input and output unit P11 connected to the diplexer DiPX2, an input and output unit P12 connected to the GSM transmission signal input terminal Tx1 via a low pass filter LPF31, and an input and output unit P13 connected to the GSM reception signal output terminal Rx1. The switch circuit SW1 corresponds to a "first switch circuit" according to various preferred embodiments of the present invention.

The input and output unit P11 is connected to the input and output unit P12 via a diode DG1 and is connected to the input and output unit P13 via a transmission line GSL2 having a length equal to about one fourth of the wavelength of a GSM transmission signal. The end of the transmission line GSL2 on the input and output unit P13 side is connected to ground via a diode DG2 and a capacitor GC5. A capacitor is connected between the input and output unit P13 and the GSM reception signal output terminal Rx1. The input and output unit P13 side of this capacitor is connected to ground via a capacitor GRxC. Here, the input and output unit P11 corresponds to a "transmission and reception signal input and output unit" according to various preferred embodiments of the present invention, the input and output unit P12 corresponds to a "transmission signal input unit" according to various preferred embodiments of the present invention, and the input and output unit P13 corresponds to a "reception signal output unit" according to various preferred embodiments of the present invention.

The cathode of the diode DG2 is connected to the transmission line GSL2, and the anode is connected to a GSM transmission and reception switching control signal input terminal VcG via a resistive element Rg. The anode of the diode DG1 is connected to the input and output unit P12 and the transmission line GSL2, and the cathode is connected to ground via an inductor GSL1.

Here, the inductors GSL1 and GSL2 and the capacitor GC5 are constituted of electrode patterns provided on the dielectric layers of the laminated body constituting the high frequency module. The capacitor GRxC and the capacitor connected to the GSM reception signal output terminal Rx1 is constituted of a capacitor mounted on the circuit substrate on which the high frequency module is mounted.

Next, in the low pass filter LPF31, an input and output unit P31 is connected to the input and output unit P12 of the switch circuit SW1 and an input and output unit P32 is connected to the GSM transmission signal input terminal Tx1 via a capacitor. The low pass filter LPF31 includes a parallel circuit of a capacitor GCc1 and an inductor GLt1 connected between the input and output units P31 and P32 and a capacitor GCu1 connected between the input and output unit P31 side of the parallel circuit and the ground. Furthermore, the elements included in the low pass filter LPF31 preferably include electrode patterns provided on the dielectric layers of the laminated body constituting the high frequency module.

Next, the GaAsIC switch GaAsSW includes five input and output units RF1 to RF5 for inputting and outputting transmission signals, a driving voltage signal input terminal Vdd, and control signal input terminals Vc1 and Vc2. The input and output terminal RF1 is connected to the input and output unit P22 of the diplexer DiPX2 via a low pass filter including a parallel circuit of an inductor DLt1 and a capacitor Ct1. The input and output terminal RF2 is connected to an input and output unit P41 of a low pass filter LPF41. Here, the low pass filter including the inductor DLt1 and the capacitor Ct1 functions as a circuit for removing harmonic distortion entering from the diplexer DiPX2 side or harmonic distortion entering from the GaAsIC switch GaAsSW.

The input and output terminals RF3 and RF4 are connected to the DCS reception signal output terminal Rx2 and the PCS reception signal output terminal Rx3, respectively, via capacitors. Moreover, the input and output terminal RF5 is connected the WCDMA transmission and reception signal input and output terminal Tx4/Rx4 via a capacitor. The GaAsIC switch GaAsSW, while the driving voltage Vdd is applied, switches the connection between the input and output terminal RF1 and one of the input and output terminals RF2 to RF5 in accordance with the combination of the on and off states of the two control signals Vc1 and Vc2. The GaAsIC switch GaAsSW is mounted on the upper surface of the laminated body constituting the high frequency module. Here, the GaAsIC switch GaAsSW corresponds to a "second switch circuit" according to various preferred embodiments of the present invention, the input and output unit RF1 corresponds to a "transmission and reception signal input and output unit" according to various preferred embodiments of the present invention, the input and output unit RF2 corresponds to a "transmission signal input unit" according to various preferred embodiments of the present invention, and RF3 and RF4 correspond to a "reception signal output unit" according to various preferred embodiments of the present invention. Furthermore, the input and output unit RF5, during transmission, corresponds to a "transmission signal input unit" according to various preferred embodiments of the present invention and, during reception, corresponds to a "reception signal output unit" according to various preferred embodiments of the present invention. Moreover, the inductor DLt1 corresponds to a "second inductive element" according to various preferred embodiments of the present invention, and the capacitor Ct1 corresponds to a "third capacitive element" according to various preferred embodiments of the present invention.

In the low pass filter LPF41, the input and output unit P41 is connected to the input and output terminal RF2 of the GaAsIC switch GaAsSW, and an input and output unit P42 is connected to the DCS/PCS transmission signal input terminal Tx23 via a capacitor. The low pass filter LPF41 includes a parallel circuit of a capacitor DCc2 and an inductor DLt2 connected between the input and output units P41 and P42 and a capacitor DCu1 connected between the DCS/PCS transmission signal input terminal Tx23 side of the parallel circuit and the ground. Furthermore, the elements included in the low pass filter LPF41 are constituted of electrode patterns provided on the dielectric layers of the laminated body constituting the high frequency module. Here, the inductor DLt2 corresponds to a "third inductive element" according to various preferred embodiments of the present invention, and the capacitor DCc2 and the capacitor DCu1 correspond to a "fourth capacitive element" according to various preferred embodiments of the present invention.

Next, the operations of the high frequency module for transmitting and receiving GSM/DCS/PCS/WCDMA communication signals will be described.

(1) Transmitting and Receiving GSM Communication Signal

To transmit a GSM transmission signal, a control signal of a positive voltage is input to the control signal input terminal VcG of the switch circuit SW1.

When a control signal of positive voltage is input to the control signal input terminal VcG, the diodes DG1 and DG2 are electrically connected, and the GSM transmission signal input to the transmission signal input terminal Tx1 is transmitted to the diplexer DiPX2 via the diode DG1. Here, since the length of the transmission line GSL2 is about one fourth of the wavelength of the GSM transmission signal and the input and output unit P13 side of the transmission line GSL2 is connected to ground via the diode DG2, the transmission line GSL2 functions as an isolation circuit having a predetermined isolation by rotating its phase with respect to the GSM transmission signal so that the reception signal output terminal Rx1 side is open when viewed from the input and output unit P11. As a result, the GSM transmission signal is transmitted to the antenna ANT via the low pass filter LPF21 of the diplexer DiPX2 but is substantially not transmitted to the GSM reception signal output terminal Rx1 side.

On the other hand, to transmit a GSM reception signal, a control signal having zero voltage or negative voltage is input to the control signal input terminal VcG.

When control signal having zero voltage or negative voltage is input to the control signal input terminal VcG, the diodes DG1 and DG2 enter an open state. When the diode DG2 enters an open state, the transmission line GSL2 functions as a simple transmission line for the GSM reception signal. Therefore, the GSM reception signal is transmitted to the GSM reception signal output terminal Rx1. When the diode DG1 enters an open state, the GSM reception signal from the antenna ANT is blocked at the diode DG1 and is not transmitted to the GSM transmission signal input terminal Tx1 side.

(2) Transmitting and Receiving DCS Communication Signal

To transmit a DCS transmission signal, control signals for connecting the input and output terminal RF1 and the input and output terminal RF2 are input to the control signal input terminals Vc1 and Vc2 of the GaAsIC switch GaAsSW. When control signals of such a combination (for example, both control signals are positive voltages) are input, the input and output terminals RF1 and RF2 of the GaAsIC switch GaAsSW are electrically connected. At this point, when a DCS transmission signal is input to the DCS/PCS transmission signal input terminal Tx23, the DCS transmission signal is input to the input and output terminal RF2 via the low pass filter LPF41, transmitted from the input and output terminal RF2 to the input and output terminal RF1, and sent from the input and output terminal RF1 to the diplexer DiPX2. This DCS transmission signal is transmitted from the antenna ANT to the outside via the diplexer DiPX2. Here, at the GaAsIC switch GaAsSW, since the input and output terminals RF1 and RF2 are connected and the other input and output terminals RF3 to RF5 are not connected to the input and output terminals RF1 and RF2, the DCS transmission signal is not transmitted to the DCS reception signal output terminal Rx2, the PCS reception signal output terminal Rx3, and the WCDMA transmission and reception signal input and output terminal Tx4/Rx4.

On the other hand, to transmit a DCS reception signal, control signals for connecting the input and output terminal RF1 and the input and output terminal RF3 is input to the control signal input terminals Vc1 and Vc2 of the GaAsIC switch GaAsSW. When control signals of such combination (for example, Vc1 is a positive voltage control signal and Vc2 is a zero voltage or negative voltage control signal) are input, the input and output terminals RF1 and RF3 of the GaAsIC switch GaAsSW are electrically connected. In this state, the DCS reception signal sent from the diplexer DiPX2 to the input and output terminal RF1 is transmitted to the input and output terminal RF3 and is output from the input and output terminal RF3. Then, the DCS reception signal is transmitted to the DCS reception signal output terminal Rx2 via a capacitor and is sent from the DCS reception signal output terminal Rx2 to an external circuit. Here, at the GaAsIC switch GaAsSW, since the input and output terminal RF1 and the input and output terminal RF3 are connected and the input and output terminals RF1 and RF3 are not connected to the other input and output terminals RF2, RF4, and RF5, the DCS reception signal is not transmitted to the DCS/PCS transmission signal input terminal Tx23, the PCS reception signal output terminal Rx3, and the WCDMA transmission and reception signal input and output terminal Tx4/Rx4.

(3) Transmitting and Receiving PCS Communication Signal

To transmit a PCS transmission signal, control signals for connecting the input and output terminal RF1 and the input and output terminal RF2 are input to the control signal input terminals Vc1 and Vc2 of the GaAsIC switch GaAsSW. When control signals of such combination (for example, both Vc1 and Vc2 are control signals having positive voltages) are input, the input and output terminals RF1 and RF2 of the GaAsIC switch GaAsSW are electrically connected. At this point, when a PCS transmission signal is input to the DCS/PCS transmission signal input terminal Tx23, the PCS transmission signal is input to the input and output terminal RF2 via the low pass filter LPF41, transmitted from the input and output terminal RF2 to the input and output terminal RF1, and sent from the input and output terminal RF1 to the diplexer DiPX2. This PCS transmission signal is transmitted from the antenna ANT to the outside via the diplexer DiPX2. Here, at the GaAsIC switch GaAsSW, since the input and output terminals RF1 and RF2 are connected and the other input and output terminals RF3 to RF5 are not connected to the input and output terminals RF1 and RF2, the PCS transmission signal is not transmitted to the DCS reception signal output terminal Rx2, the PCS reception signal output terminal Rx3, and the WCDMA transmission and reception signal input and output terminal Tx4/Rx4.

On the other hand, to transmit a PCS reception signal, control signals for connecting the input and output terminal RF1 and the input and output terminal RF4 are input to the control signal input terminals Vc1 and Vc2 of the GaAsIC switch GaAsSW. When control signals of such combination (for example, Vc1 is a zero voltage or negative voltage control signal and Vc2 is a positive voltage control signal) are input, the input and output terminals RF1 and RF4 of the GaAsIC switch GaAsSW are electrically connected. In this state, the PCS reception signal sent from the diplexer DiPX2 to the input and output terminal RF1 is transmitted to the input and output terminal RF4 and is output from the input and output terminal RF4. Then, the PCS reception signal is transmitted to the PCS reception signal output terminal Rx3 via a capacitor and is sent from the PCS reception signal output terminal Rx3 to an external circuit. Here, at the GaAsIC switch GaAsSW, since the input and output terminals RF1 and RF4 are connected and the input and output terminals RF1 and RF4 are not connected to the other input and output terminals RF2, RF3, and RF5, the PCS reception signal is not transmitted to the DCS/PCS transmission signal input terminal Tx23, the DCS reception signal output terminal Rx2, and the WCDMA transmission and reception signal input and output terminal Tx4/Rx4.

(4) Transmitting and Receiving WCDMA Communication Signal

To transmit a WCDMA communication signal, control signals for connecting the input and output terminal RF1 and the input and output terminal RF5 are input to the control signal input terminals Vc1 and Vc2 of the GaAsIC switch GaAsSW. When control signals of such a combination (for example, both Vc1 and Vc2 are control signals having zero voltage or negative voltage) are input, the input and output terminals RF1 and RF5 of the GaAsIC switch GaAsSW are electrically connected. At this point, the WCDMA transmission signal sent from the WCDMA transmission and reception signal input and output terminal Tx4/Rx4 to the input and output terminal RF5 is transmitted to the input and output terminal RF1 and is transmitted from the input and output terminal RF1 to the outside via the diplexer DiPX2 and the antenna ANT. On the other hand, the WCDMA reception signal sent from the diplexer DiPX2 to the input and output terminal RF1 is transmitted to the input and output terminal RF5, transmitted from the input and output terminal RF5 to the WCDMA transmission and reception signal input and output terminal Tx4/Rx4 via a capacitor, and is sent from the WCDMA transmission and reception signal input and output terminal Tx4/Rx4 to an external circuit. Here, at the GaAsIC switch GaAsSW, since the input and output terminals RF1 and RF5 are connected and the input and output terminals RF1 and RF5 are not connected to the other input and output terminals RF2 to RF4, the WCDMA transmission and reception signals are not transmitted to the DCS/PCS transmission signal input terminal Tx23, the DCS reception signal output terminal Rx2, and the PCS reception signal output terminal Rx3.

According to such a configuration, a high frequency module capable of transmitting and receiving four types of communication signals, i.e., GSM/DCS/PCS/WCDMA communication signals, via one antenna is provided.

Switching of transmission and reception of GSM communication signals whose working frequency band is a low frequency band is carried out by the switch circuit SW1, whereas switching of transmission and reception of the DCS/PCS/

WCDMA communication signals whose working frequency band is a high frequency band is carried by the GaAsIC switch GaAsSW. In this way, the number of components can be significantly reduced compared to the number of components required when the high frequency module is entirely constructed of diode switch circuits. Thus, the size of the high frequency module can be reduced. Moreover, since all transmission and reception switching operations are not carried out only by the GaAsIC switch, the number of switching points of the GaAsIC switch can be reduced, and the GaAsIC switch can be produced at relatively low cost. Accordingly, the high frequency module according to various preferred embodiments of the present invention can be produced at lower cost than that of a high frequency module that carries out the transmission and reception switching operations of all communication signals by a single GaAsIC switch.

Next, the structure of the laminated body of the high frequency module will be described with reference to FIGS. 2 and 3.

Figure 2:
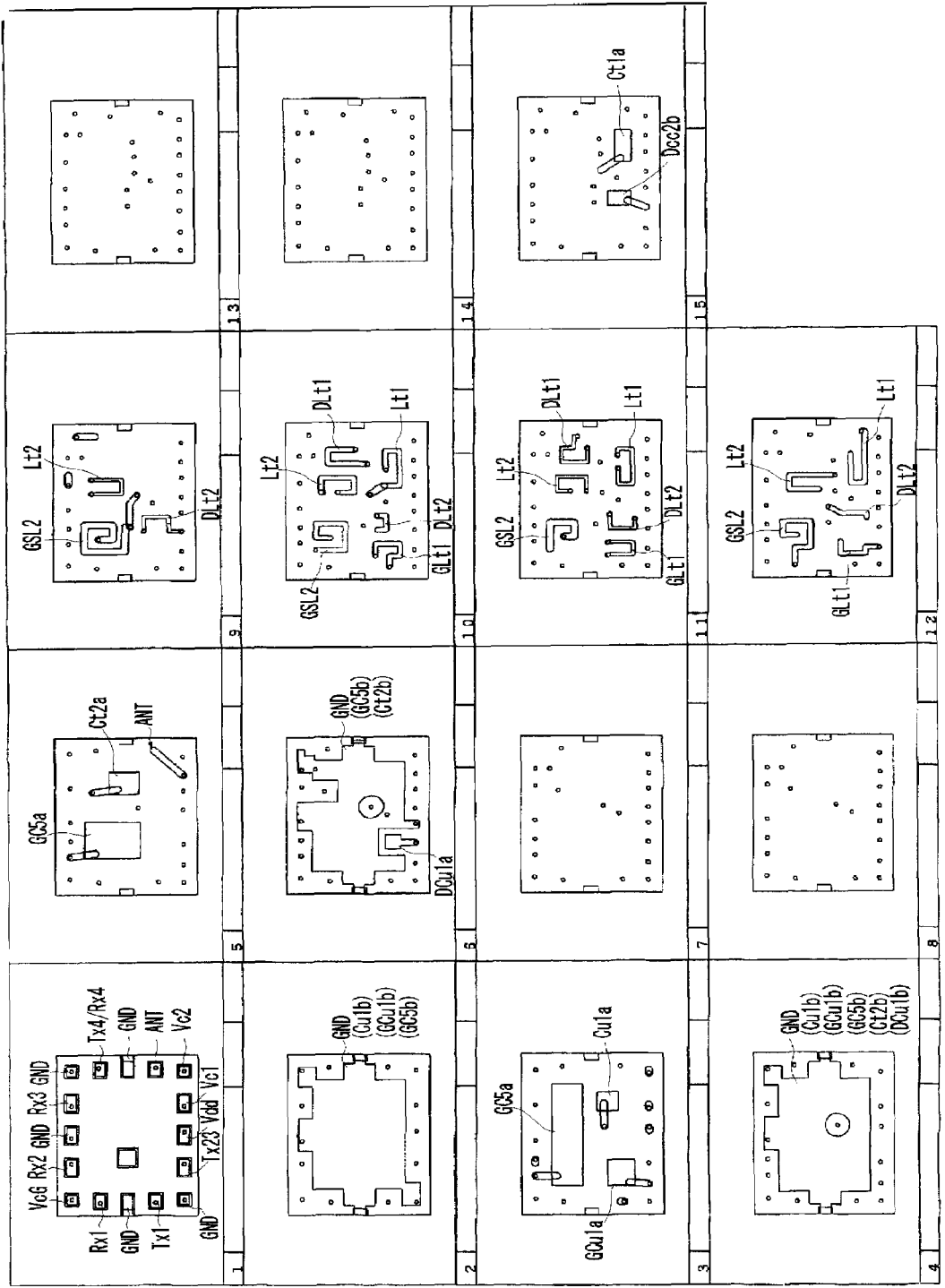
FIG. 2 illustrates a plan view of the high frequency module shown in FIG. 1.
Figure 3:
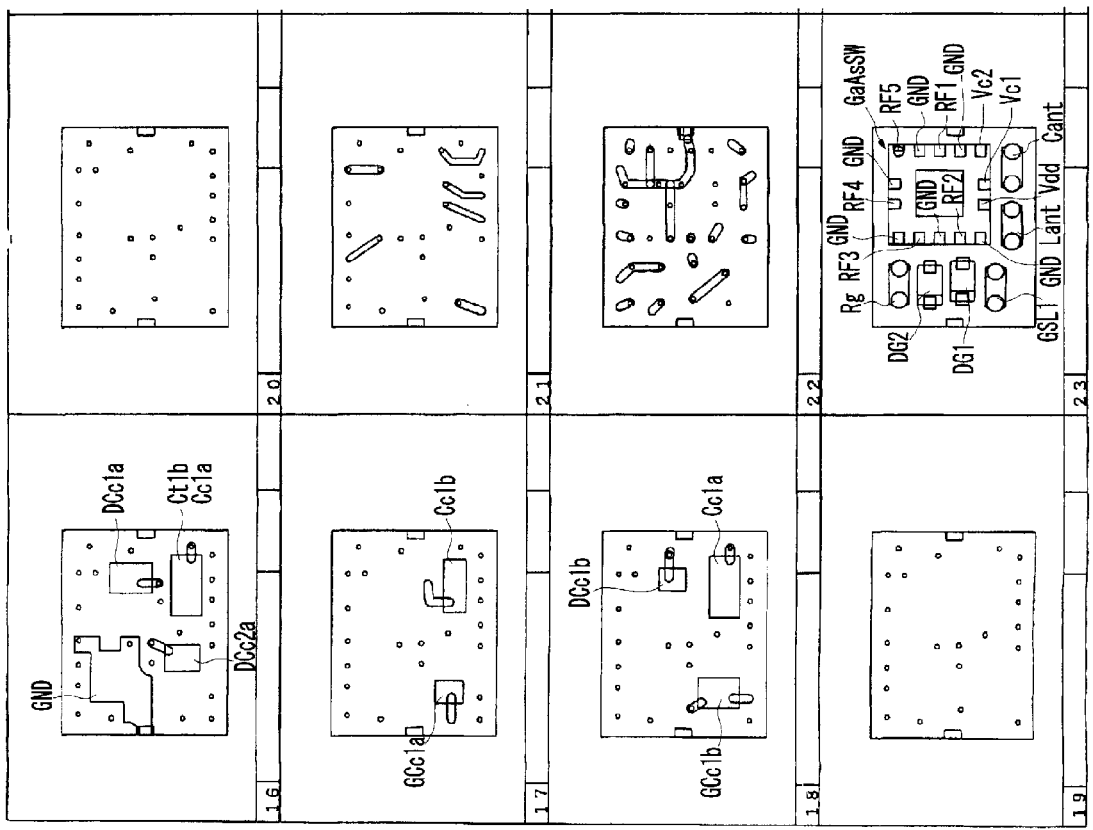
FIG. 3 illustrates a plan view of the high frequency module shown in FIG. 1.

FIGS. 2 and 3 illustrate plan views of the high frequency module according to the present preferred embodiment.

A laminated substrate type high frequency module is constructed by stacking dielectric layers 1 to 22, shown in FIGS. 2 and 3, from the bottom to top in order. FIGS. 2 and 3 illustrate the dielectric layers 1 to 22 viewed from the lower surface (i.e., the surface facing the mounting substrate). The dielectric layer 23 includes electrodes and components on the back surface (upper surface) of the dielectric layer 22, i.e., the component-mounting surface. The reference numerals in FIGS. 2 and 3 correspond to the reference numerals indicating the elements in FIG. 1.

On the lowermost dielectric layer 1, various external terminal electrodes to be mounted on the mounting substrate are provided. More specifically, the dielectric layer 1 includes the GSM transmission signal input terminal Tx1, the GSM reception signal output terminal Rx1, the DCS/PCS transmission signal input terminal Tx23, the DCS reception signal output terminal Rx2, the PCS reception signal output terminal Rx3, the WCDMA transmission and reception signal input and output terminal Tx4/Rx4, the control signal input terminals VcG, Vc1, and Vc2, the driving voltage input terminal Vdd, a ground terminal GND, and an antenna connection terminal ANT (corresponding to the input and output unit P23 of the diplexer DiPX2).

On the dielectric layer 2, a common ground electrode GND is provided. This common ground electrode GND also functions as one of the opposing electrodes Cu1b of the capacitor Cu1, one of the opposing electrodes GCu1b of the capacitor GCu1, and one of the opposing electrodes GC5b of the capacitor GC5.

On the dielectric layer 3, the other opposing electrode Cu1a of the capacitor Cu1, the other opposing electrode GCu1a of the capacitor GCu1, and the other opposing electrode GC5a of the capacitor GC5 are provided.

On the dielectric layer 4, a common ground electrode GND is provided. This common ground electrode GND also functions as one of the opposing electrodes Cu1b of the capacitor Cu1, one of the opposing electrodes GCu1b of the capacitor GCu1, one of the opposing electrodes GC5b of the capacitor GC5, one of the opposing electrodes Ct2b of the capacitor Ct2, and one of the opposing electrodes DCu1b of the capacitor DCu1.

On the dielectric layer 5, the other opposing electrode GC5a of the capacitor GC5, the other opposing electrode Ct2a of the capacitor Ct2 are provided, and, also, a pattern electrode connecting the opposing electrode of the capacitor Cc1 provided on the dielectric layer 18 and the antenna connection terminal ANT is provided.

On the dielectric layer 6, a common ground electrode GND and the other opposing electrode of the capacitor DCu1 are provided. The common ground electrode GND also functions as one of the opposing electrodes GC5b of the capacitor GC5 and one of the electrodes Ct2b of the capacitor Ct2.

On the dielectric layers 7 and 8, only through-holes are provided.

On the dielectric layer 9, the transmission line GSL2 and the inductors Lt2 and DLt2 are provided.

On the dielectric layer 10, the transmission line GSL2 and the inductors Lt1, Lt2, DLt1, DLt2, and GLt1 are provided. Also on the dielectric layer 11, the transmission line GSL2 and the inductors Lt1, Lt2, DLt1, DLt2, and GLt1 are provided, each of which are electrically connected by through holes. It is desirable to provide the inductor DLt1 and the inductor DLt2 in different areas when viewed from the top, i.e., when viewed in the stacking direction of the laminated body defined by stacking dielectric layers. If these inductors are disposed close to each other, unwanted signals are wrapped around, and transmission and reception of a predetermined signal becomes difficult. In other words, by locating the inductor DLt1 and the inductor DLt2 in different areas when viewed from the top, isolation between the inductors are maintained, and wraparound due to signals passing over the GaAsIC switch GaAsSW can be prevented.

On the dielectric layer 12, the transmission line GSL2 and the inductors Lt1, Lt2, DLt1, and GLt1 are provided, each of which are electrically connected to pattern electrodes of corresponding elements provided on the dielectric layer 11 by through holes.

On the dielectric layers 13 and 14, only through-holes are provided.

On the dielectric layer 15, one of the opposing electrodes Ct1a of the capacitor Ct1 and one of the opposing electrodes DCc2b of the capacitor DCc2 are provided.

On the dielectric layer 16, an intermediate ground electrode GND is provided and, also, the other opposing electrode Ct1b of the capacitor Ct1, the other opposing electrode DCc2a of the capacitor DCc2, and one of the opposing electrodes DCc1a of the capacitor DCc1 are provided. Here, the other opposing electrode Ct1b of the capacitor Ct1 also functions as one of the opposing electrodes Cc1a of the capacitor Cc1.

On the dielectric layer 17, the other opposing electrode Cc1b of the capacitor Cc1 and one of the opposing electrodes GCc1a of the capacitor GCc1 are provided. On the dielectric layer 18, one of the opposing electrodes Cc1a of the capacitor Cc1, the other opposing electrode DCc1b of the capacitor DCc1, and the other opposing electrode GCc1b of the capacitor GCc1 are provided.

On the dielectric layers 19 and 20, only through-holes are provided. On the dielectric layers 21 and 22, electrode patterns for electrically connecting the electrode patterns provided on the lower layer sides of the dielectric layers 1 to 18 and the front surface of the dielectric layer 23, which is the uppermost layer, in accordance with the pattern shown in FIG. 1.

On the back side of the dielectric layer 22 of the uppermost layer, i.e., the upper surface 23 of the laminated body, mounting electrodes for the diodes DG1 and DG2, a mounting electrode for the resistive element Rg, mounting electrodes for the inductors GSL1 and Lant, a mounting electrode for the capacitor Cant, and a mounting electrode for the GaAsIC switch GaAsSW are provided. On the mounting electrodes, the diodes DG1 and DG2, the resistive element Rg, the inductors GSL1 and Lant, the capacitor Cant, and the GaAsIC switch GaAsSW are mounted.

With such a unique structure, one of the electrodes of the capacitor Ct2 of the high pass filter HPF22 of the diplexer DiPX2 can be provided using the ground electrode at a lower layer close to the bottom surface of the laminated body. By forming the capacitor Ct2 in this way, the capacitor Ct2 will have a static electricity discharge function. Consequently, even when static electricity is applied from the antenna ANT side, the static electricity is discharged at the capacitor Ct2 and is not applied to the GaAsIC switch GaAsSW. Therefore, the GaAsIC switch GaAsSW can be prevented from being damaged by static electricity. Since the capacitor Ct2 is a preferably capacitor originally provided with the diplexer DiPX2, by using the structure of the laminated body according to this preferred embodiment, the GaAsIC switch can be used without providing an additional static electricity discharge circuit. In other words, the above-described high frequency module including the diode switch circuit and the GaAsIC switch can be prevented from being damaged by static electricity without providing an additional circuit.

Next, a high frequency module according to a second preferred embodiment of the present invention will be described with reference to FIGS. 4 to 6.

Figure 4:
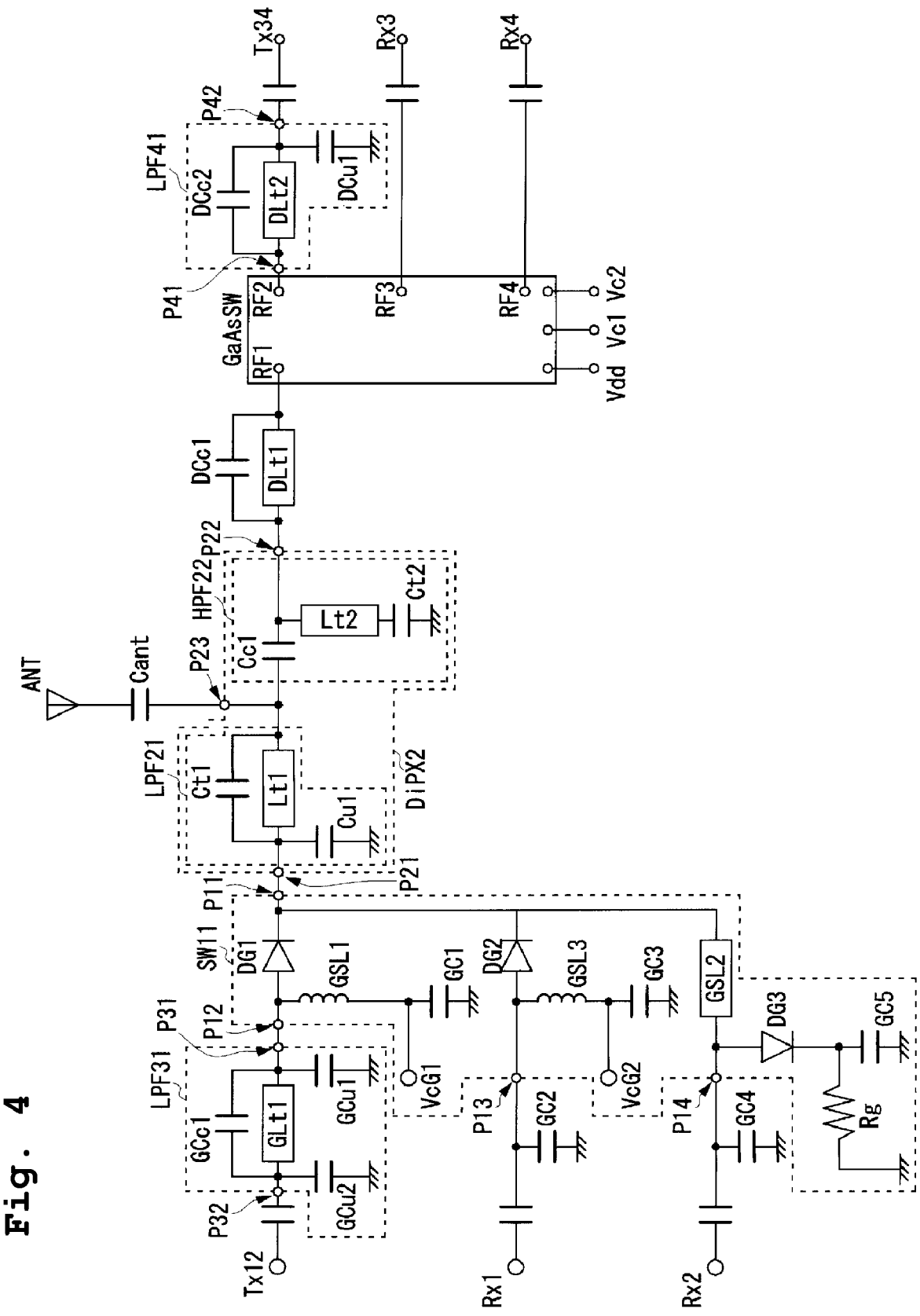
FIG. 4 illustrates an equivalent circuit diagram of a high frequency module according to a second preferred embodiment of the present invention.

FIG. 4 illustrates an equivalent circuit diagram of the high frequency module according to the present preferred embodiment. In the case described below, a GSM850 transmission signal or a GSM900 transmission signal is input to a transmission signal input terminal Tx12, a GSM850 reception signal is output from a reception signal output terminal Rx1, a GSM900 reception signal is output from a reception signal output terminal Rx2, a DCS transmission signal or a PCS transmission signal is input to a transmission signal input terminal Tx34, a DCS reception signal is output from a reception signal output terminal Rx3, and a PCS reception signal is output from a reception signal output terminal Rx4. Here, the structures of a diplexer DiPX2 and low pass filters LPF31 and LPF41 are preferably substantially the same as those according to the first preferred embodiment of the present invention. Therefore, descriptions thereof are not repeated.

A switch circuit SW11 preferably includes an input and output unit P11 connected to the diplexer DiPX2, an input and output unit P12 connected to the GSM850/900 transmission signal input terminal Tx12 via the low pass filter LPF31, an input and output unit P13 connected to the GSM850 reception signal output terminal Rx1, and an input and output unit P14 connected to the GSM900 reception signal output terminal Rx2. The switch circuit SW11 corresponds to a "first switch circuit" according to various preferred embodiments of the present invention. The input and output units P11 and P12 correspond to a "transmission and reception signal input and output unit" and a "transmission signal input unit," respectively, according to various preferred embodiments of the present invention. The input and output units P13 and P14 correspond to a "reception signal output unit" according to various preferred embodiments of the present invention.

The input and output unit P11 is connected to the input and output unit P12 via a diode DG1, connected to the input and output unit P13 via a diode DG2, and connected to the input and output unit P14 via a transmission line GSL2 having a length of about one fourth of the wavelength of the GSM850/900 transmission signal.

The end of the input and output unit P14 side of the transmission line GSL2 is connected to ground via a diode DG3 and a capacitor GC5.

A capacitor is connected between the input and output unit P13 and the GSM850 reception signal output terminal Rx1.

The input and output unit P13 side of the capacitor is connected to ground via a capacitor GC2. A capacitor is connected between the input and output unit P14 and the GSM900 reception signal output terminal Rx2. The input and output unit P14 side of the capacitor is connected to ground via a capacitor GC4.

The cathode of the diode DG1 is connected to the input and output unit P11, whereas the anode is connected to the input and output unit P12 and a GSM transmission and reception switching control signal input terminal VcG1 via an inductor GSL1. The cathode of the diode DG2 is connected to the input and output unit P11, whereas the anode is connected to the input and output unit P13 and a GSM transmission and reception switching control signal input terminal VcG2 via an inductor GSL3. The anode of the diode DG3 is connected to the input and output unit P14 and the transmission line GSL2, whereas the cathode is connected to ground via the resistive element Rg. Here, the GSM transmission and reception switching control signal input terminals VcG1 and VcG2 are connected to ground via capacitors GC1 and GC3, respectively.

Here, the inductors GSL1, GSL2, and GSL3 and the capacitors GC1, GC2, GC3, GC4, and GC5 are constituted of electrode patterns formed on the dielectric layers of the laminated body constituting the high frequency module. The capacitors connected to the GSM850 reception signal input and output terminal Rx1 and the GSM900 reception signal input and output terminal Rx2 are constituted of capacitors mounted on the circuit substrate on which the high frequency module is mounted.

Next, at a GaAsIC switch GaAsSW, four input and output terminals RF1 to RF4 for inputting and outputting transmission signals, a driving voltage signal input terminal Vdd, and control signal input terminals Vc1 and Vc2 are provided. The input and output terminal RF1 is connected to an input and output terminal P22 of the diplexer DiPX2 via a parallel circuit of an inductor DLtl and a capacitor DCc1. The input and output terminal RF2 is connected to an input and output unit P41 of the low pass filter LPF41. The input and output terminals RF3 and RF4 are connected to the DCS reception signal output terminal Rx3 and the PCS reception signal output terminal Rx4, respectively, via capacitors. The GaAsIC switch GaAsSW, while the driving voltage Vdd is applied, switches the connection between the input and output terminal RF1 and one of the input and output terminals RF2 to RF5 in accordance with the combination of the on and off states of the two control signals Vc1 and Vc2. The GaAsIC switch GaAsSW is mounted on the upper surface of the laminated body constituting the high frequency module. Here, the GaAsIC switch GaAsSW corresponds to a "second switch circuit" according to various preferred embodiments of the present invention. The input and output terminals RF1 and RF2 correspond to a "transmission and reception signal input and output unit" and a "transmission signal input unit," respectively, according to various preferred embodiments of the present invention. The input and output terminals RF3 and RF4 correspond to a "reception signal output unit" according to various preferred embodiments of the present invention.

Next, the operations of the high frequency module for transmitting and receiving GSM850/GAM900/DCS/PCS communication signals will be described.

(1) Transmitting and Receiving GSM850 Communication Signal

To transmit a GSM850 transmission signal, a control signal of positive voltage is input to the control signal input terminal VcG1 of the switch circuit SW11, and a control signal of zero voltage or negative voltage is input to the control signal input terminal VcG2.

When a control signal of positive voltage is sent from the control signal input terminal VcG1, the diodes DG1 and DG3 are electrically connected, and the GSM850 transmission signal input to the GSM850/900 transmission signal input terminal Tx12 is transmitted to the diplexer DiPX2 via the diode DG1. Here, since the length of the transmission line GSL2 is about one fourth of the wavelength of the GSM transmission signal and the input and output unit P14 side of the transmission line GSL2 is connected to ground via the diode DG3, the transmission line GSL2 functions as an isolation circuit having a predetermined isolation by rotating its phase with respect to the GSM transmission signal so that the GSM900 reception signal output terminal Rx2 side is open when viewed from the cathode of the diode DG1 (input and output unit P11). When a zero voltage or a negative voltage is input to the control signal input terminal VcG2, the diode DG2 enters an open state. Therefore, the diode DG1 to the GSM850 reception signal output terminal side becomes open. Consequently, the GSM850 transmission signal is substantially not transmitted to the GSM850 reception signal output terminal Rx1 and the GSM900 reception signal output terminal Rx2 side.

On the other hand, to transmit a GSM850 reception signal, a control signal of zero voltage or negative voltage is input to the control signal input terminal VcG1 and a control signal of positive voltage is input to the control signal input terminal VcG2.

When a positive voltage is input to the control signal input terminal VcG2, the diodes DG2 and DG3 are electrically connected, and the GSM850 reception signal sent from the diplexer DiPX2 is transmitted to the GSM850 reception signal output terminal Rx1 via the diode DG2. Here, since the length of the transmission line GSL2 is about one fourth of the wavelength of the GSM transmission signal and the input and output unit P14 side of the transmission line GSL2 is connected to ground via the diode DG3, the transmission line GSL2 functions as an isolation circuit having a predetermined isolation by rotating its phase with respect to the GSM850 reception signal so that the GSM900 reception signal output terminal Rx2 side is open when viewed from the input and output unit P11. When a control signal of zero voltage or negative voltage is input to the control signal input terminal VcG1, the diode DG1 enters an open state. Therefore, the diode DG1 to the GSM850/900 transmission signal output terminal Tx12 side becomes open to GSM850 reception signals. Consequently, the GSM850 reception signal input to the diplexer DiPX2 is transmitted only to the GSM850 reception signal output terminal Rx1.

(2) Transmitting and Receiving GSM900 Communication Signal

Since a GSM900 transmission signal is input to the GSM850/900 transmission signal input terminal Tx12 as the GSM850 transmission signal to which the GSM850 transmission signal is input, the same control as that for transmitting a GSM850 signal is used.

On the other hand, to transmit a GSM900 reception signal, control signals of zero voltage or negative voltage are input to both the control signal input terminals VcG1 and VcG2.

When zero voltages or negative voltages are input to the control signal input terminals VcG1 and VcG2, the diodes DG1, DG2, and DG3 enter an open state, and the transmission line GSL2 functions as a simple transmission line for the GSM900 reception signal. Therefore, the GSM900 reception signal sent from the diplexer DiPX2 to the switch circuit SW11 is transmitted to the GSM900 reception signal output terminal Rx2 via the transmission line GSL2 and is sent from the GSM900 reception signal output terminal Rx2 to an external circuit. Since the diodes DG1 and DG2 are in an open state, the GSM900 reception signal sent from the diplexer DiPX2 to the switch circuit SW11 is not transmitted to the GSM850/900 transmission signal input terminal Tx12 and GSM850 reception signal output terminal Rx1. In this way, the GSM900 reception signal sent from the diplexer DiPX2 is transmitted only to the GSM900 reception signal output terminal Rx2.

(3) Transmitting and Receiving DCS Communication Signal

To transmit a DCS transmission signal, control signals for connecting the input and output terminal RF1 and the input and output terminal RF2 are input to the control signal input terminals Vc1 and Vc2 of the GaAsIC switch GaAsSW. When control signals of such combination (for example, both control signals are positive voltages) are input, the input and output terminals RF1 and RF2 of the GaAsIC switch GaAsSW are electrically connected. At this point, when a DCS transmission signal is input to the DCS/PCS transmission signal input terminal Tx34, the DCS transmission signal is input to the input and output terminal RF2 via the low pass filter LPF41, transmitted from the input and output terminal RF2 to the input and output terminal RF1, and sent from the input and output terminal RF1 to the diplexer DiPX2. The DCS transmission signal is transmitted from the antenna ANT to the outside via the diplexer DiPX2. Here, at the GaAsIC switch GaAsSW, since the input and output terminals RF1 and RF2 are connected and the other input and output terminals RF3 and RF4 are not connected to the input and output terminals RF1 and RF2, the DCS transmission signal is not transmitted to the DCS reception signal output terminal Rx3 and the PCS reception signal output terminal Rx4.

On the other hand, to transmit a DCS reception signal, control signals for connecting the input and output terminal RF1 and the input and output terminal RF3 are input to the control signal input terminals Vc1 and Vc2 of the GaAsIC switch GaAsSW. When control signals of such combination (for example, Vc1 is a positive voltage control signal and Vc2 is a zero voltage or negative voltage control signal) are input, the input and output terminals RF1 and RF3 of the GaAsIC switch GaAsSW are electrically connected. In this state, the DCS reception signal sent from the diplexer DiPX2 to the input and output terminal RF1 is transmitted to the input and output terminal RF3. Then, the DCS reception signal is output from the input and output terminal RF3, transmitted to the DCS reception signal output terminal Rx3 via a capacitor, and sent from the DCS reception signal output terminal Rx3 to an external circuit. Here, at the GaAsIC switch GaAsSW, since the input and output terminals RF1 and RF3 are connected and the input and output terminals RF1 and RF3 are not connected to the other input and output terminals RF2 and RF4, the DCS reception signal is not transmitted to the DCS/PCS transmission signal input terminal Tx34 and the PCS reception signal output terminal Rx4.

(4) Transmitting and Receiving PCS Communication Signal

To transmit a DCS transmission signal, control signals for connecting the input and output terminal RF1 and the input and output terminal RF2 are input to the control signal input terminals Vc1 and Vc2 of the GaAsIC switch GaAsSW. When control signals of such combination (for example, both control signals are positive voltages) are input, the input and output terminals RF1 and RF2 of the GaAsIC switch GaAsSW are electrically connected. At this point, when a PCS transmission signal is input to the DCS/PCS transmission signal input terminal Tx34, the PCS transmission signal is input to the input and output terminal RF2 via the low pass filter LPF41, transmitted from the input and output terminal RF2 to the input and output terminal RF1, and sent from the input and output terminal RF1 to the diplexer DiPX2. The PCS transmission signal is transmitted from the antenna ANT to an external circuit via the diplexer DiPX2. Here, at the GaAsIC switch GaAsSW, since the input and output terminals RF1 and RF2 are connected and the other input and output terminals RF3 and RF4 are not connected to the input and output terminals RF1 and RF2, the PCS transmission signal is not transmitted to the DCS reception signal output terminal Rx3 and the PCS reception signal output terminal Rx4.

On the other hand, to transmit a PCS reception signal, control signals for connecting the input and output terminal RF1 and the input and output terminal RF4 are input to the control signal input terminals Vc1 and Vc2 of the GaAsIC switch GaAsSW. When control signals of such a combination (for example, Vc1 is a zero voltage or negative voltage control signal and Vc2 is a positive voltage control signal) are input, the input and output terminals RF1 and RF4 of the GaAsIC switch GaAsSW are electrically connected. In this state, the PCS reception signal sent from the diplexer DiPX2 to the input and output terminal RF1 is transmitted to the input and output terminal RF4. Then, the PCS reception signal is output from the input and output terminal RF4, transmitted to the PCS reception signal output terminal Rx4 via a capacitor, and sent from the PCS reception signal output terminal Rx4 to an external circuit. Here, at the GaAsIC switch GaAsSW, since the input and output terminals RF1 and RF4 are connected, and the input and output terminals RF1 and RF4 are not connected to the other input and output terminals RF2 and RF3, the PCS reception signal is not transmitted to the DCS/PCS transmission signal input terminal Tx34 and the DCS reception signal output terminal Rx3.

In this way, even when a plurality of communication systems exist on the lower area of a predetermined frequency and when a plurality of communication systems exist in the higher area, if the lower area side is constituted of a diode switch circuit and the higher area side is constituted of GaAsIC switch, a frequency module having a smaller size and lower loss compared to those of a high frequency module entirely constituted of diode switch circuits can be provided. Furthermore, the high frequency module can be provided at lower cost than that of a high frequency module configured so that switching of all communication signals is carried out with a GaAs switch.

Next, the structure of the laminated body of the high frequency module will be described with reference to FIGS. 5 and 6.

Figure 5:
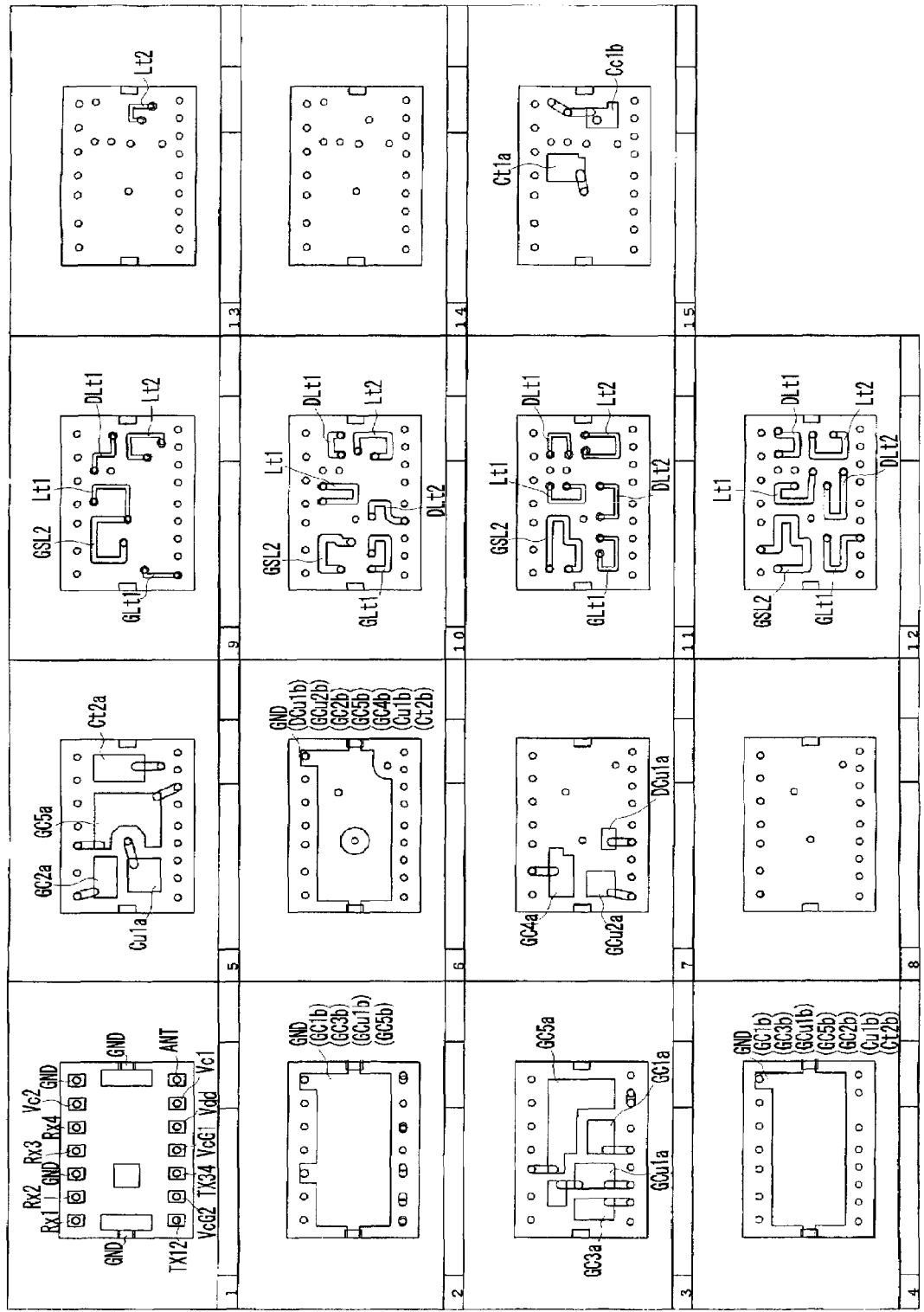
FIG. 5 illustrates a plan view of the high frequency module shown in FIG. 3.
Figure 6:
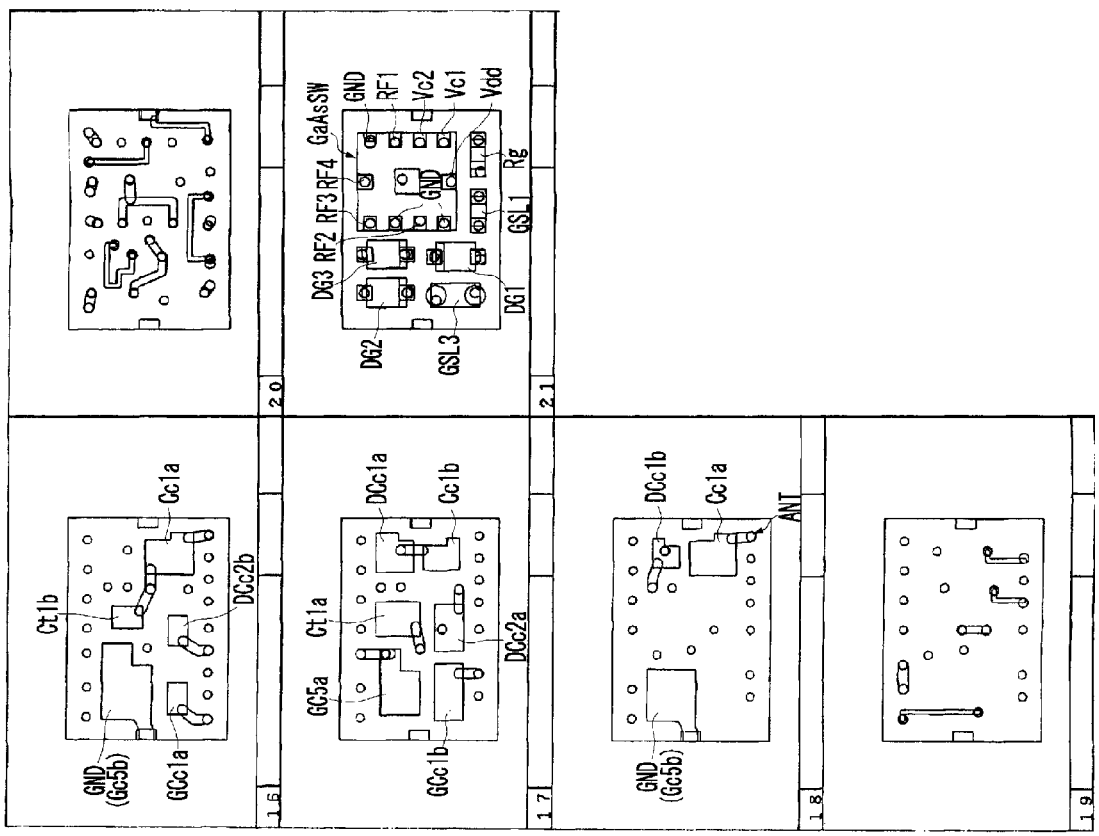
FIG. 6 illustrates a plan view of the high frequency module shown in FIG. 3.

FIGS. 5 and 6 illustrate plan views of a high frequency module according to another preferred embodiment of the present invention.

A laminated substrate type high frequency module is constructed by stacking dielectric layers 1 to 20, shown in FIGS. 5 and 6, from the bottom to top in order. FIGS. 5 and 6 illustrate the dielectric layers 1 to 20 viewed from the lower surface (i.e., the surface facing the mounting substrate). The dielectric layer 21 includes electrodes and components on the back surface (upper surface) of the dielectric layer 20, i.e., the component-mounting surface. The reference numerals in FIGS. 5 and 6 correspond to the reference numerals indicating the elements in FIG. 4.

On the lowermost dielectric layer 1, various external terminal electrodes to be mounted on the mounting substrate are provided. More specifically, the dielectric layer 1 includes the GSM850/900 transmission signal input terminal Tx12, the GSM850 reception signal output terminal Rx1, the GSM900 reception signal output terminal Rx2, the DCS/PCS transmission signal input terminal Tx34, the DCS reception signal output terminal Rx3, the PCS reception signal output terminal Rx4, the control signal input terminals VcG1, VcG2, Vc1, and Vc2, the driving voltage input terminal Vdd, a ground terminal GND, and an antenna connection terminal ANT (corresponding to the input and output unit P23 of the diplexer DiPX2).

On the dielectric layer 2, a common ground terminal GND is provided. The common ground terminal GND also functions as one of the opposing electrodes GC1b of the capacitor GC1, one of the opposing electrodes GC3b of the capacitor GC3, one of the opposing electrodes GC5b of the capacitor GC5, and one of the opposing electrodes GCu1b of the capacitor GCu1.

On the dielectric layer 3, the other opposing electrode GC1a of the capacitor GC1, the other opposing electrode GC3a of the capacitor GC3, the other opposing electrode GC5a of the capacitor GC5, and the other opposing electrode GCu1a of the capacitor GCu1 are provided.

On the dielectric layer 4, a common ground terminal GND is provided. The common ground terminal GND also functions as one of the opposing electrodes GC1b of the capacitor GC1, one of the opposing electrodes GC3b of the capacitor GC3, one of the opposing electrodes GC5b of the capacitor GC5, one of the opposing electrodes GCu1b of the capacitor GCu1, one of the opposing electrodes GC2b of the capacitor GC2, one of the opposing electrodes Cu1b of the capacitor Cu1, and one of the opposing electrodes Ct2b of the capacitor Ct2.

On the dielectric layer 5, the other opposing electrode GC5a of the capacitor GC5, the other opposing electrode GC2a of the capacitor GC2, the other opposing electrode Cu1a of the capacitor Cu1, and the other opposing electrode Ct2a of the capacitor Ct2 are provided.

On the dielectric layer 6, a common ground terminal GND is provided. The common ground terminal GND also functions as one of the opposing electrodes GC5b of the capacitor GC5, one of the opposing electrodes GC2b of the capacitor GC2, one of the opposing electrodes Cu1b of the capacitor Cu1, one of the opposing electrodes Ct2b of the capacitor Ct2, one of the opposing electrodes GC4b of the capacitor GC4, one of the opposing electrodes GCu2b of the capacitor GCu2, and one of the opposing electrodes DCu1b of the capacitor DCu1.

On the dielectric layer 7, the other opposing electrode GC4a of the capacitor GC4, the other opposing electrode GCu2a of the capacitor GCu2, and the other opposing electrode DCu1a of the capacitor DCu1 are provided.

On the dielectric layer 8, only through-holes are provided.

On the dielectric layer 9, the transmission line GSL2 and the inductors Lt1, Lt2, DLt1, and GLt1 are provided.

From the dielectric layer 10 to the dielectric layer 12, the transmission line GSL2 and the inductors Lt1, Lt2, DLt1, DLt2, and GLt1 are provided.

On the dielectric layer 13, the inductor Lt2 is provided.

On the dielectric layer 14, only through-holes are provided.

On the dielectric layer 15, one of the opposing electrodes Ct1a of the capacitor Ct1 and one of the opposing electrodes Cc1b of the capacitor Cc1 are provided.

On the dielectric layer 16, an intermediate ground electrode GND that is one of the opposing electrodes GC5b of the capacitor GC5, the other opposing electrode Ct1b of the capacitor Ct1, the other opposing electrode Cc1a of the capacitor Cc1, one of the opposing electrodes GCa1a of the capacitor GCa1, and one of the opposing electrodes DCc2b of the capacitor DCc2 are provided.

On the dielectric layer 17, one of the opposing electrodes Cc1b of the capacitor Cc1, one of the opposing electrodes Ct1a of the capacitor Ct1, the other opposing electrode GC5a of the capacitor GC5, the other opposing electrode GCc1b of the capacitor GCc1, the other opposing electrode DCc2a of the capacitor DCc2, and one of the opposing electrodes DCc1a of the capacitor DCc1 are provided.

On the dielectric layer 18, an intermediate ground electrode GND that is one of the opposing electrodes GC5b of the capacitor GC5, the other opposing electrode Cc1a of the capacitor Cc1, and the other opposing electrode DCc1b of the capacitor DCc1 are provided.

On the dielectric layers 19 and 20, electrode patterns for electrically connecting the pattern electrodes provided on the lower layer side of the dielectric layers 1 to 18 and the electrode provided on the front surface of the dielectric layer 21, which is the uppermost layer, in accordance with the pattern shown in FIG. 1.

On the back side of the dielectric layer 20 of the uppermost layer, i.e., the upper surface 21 of the laminated body, mounting electrodes for the diodes DG1, DG2, and DG3, a mounting electrode for the resistive element Rg, mounting electrodes for the inductors GSL1 and GSL3, and a mounting electrode for the GaAsIC switch GaAsSW are provided. On the mounting electrodes, the diodes DG1, DG2, and DG3, the resistive element Rg, the inductors GSL1 and GSL3, and the GaAsIC switch GaAsSW are mounted.

With such a unique structure, one of the electrodes of the capacitor Ct2 of the high pass filter HPF22 of the diplexer DiPX2 can be provided by the ground electrode at a lower layer close to the bottom surface of the laminated body. By providing the capacitor Ct2 in this way, the capacitor will have a static electricity discharge function. Consequently, even when static electricity is applied from the antenna ANT side, the static electricity is discharged at the capacitor Ct2 and is not applied to the GaAsIC switch GaAsSW. Therefore, the GaAsIC switch GaAsSW can be prevented from being damaged by static electricity. Since the capacitor Ct2 is a capacitor originally provided with the diplexer DiPX2, by using the structure of the laminated body according to this preferred embodiment, the GaAsIC switch can be used without providing an additional static electricity discharge circuit. In other words, the above-described high frequency module including the diode switch circuit and the GaAsIC switch can be prevented from being damaged by static electricity without providing an additional circuit.

While preferred embodiments of the present invention have been described above, it is to be understood that variations and modifications will be apparent to those skilled in the art without departing the scope and spirit of the present invention. The scope of the present invention, therefore, is to be determined solely by the following claims.

The invention claimed is:

1. A high frequency module comprising:
a diplexer arranged to separate signals of a plurality of communication systems transmitted and received via an antenna, the communication systems having transmission and reception bands of different frequency bands, the signals of a plurality of communication systems being separated into a signal of a first communication system having a transmission and reception band in an area higher than a predetermined frequency and a signal of a second communication system having a transmission and reception band in an area lower than a predetermined frequency;
a first switch circuit arranged to switch transmission and reception of the signal of the second communication system having a transmission and reception band in a lower area; and
a second switch circuit arranged to switch transmission and reception of the signal of the first communication system having a transmission and reception band in a higher area; wherein
the diplexer, the first switch circuit, and the second switch circuit include electrodes provided on a laminated body constructed by stacking a plurality of dielectric layers and components mounted on the laminated body;
the diplexer includes a low pass filter arranged to allow the signal of the second communication system having a transmission and reception band in an area lower than a predetermined frequency to pass through and a high pass filter arranged to allow the signal of the first communication system having a transmission and reception band in an area higher than a predetermined frequency to pass through;
the first switch circuit includes a first transmission and reception signal input and output unit connected to the low pass filter of the diplexer and configured to output a predetermined transmission signal of the second communication system having a transmission and reception band in a lower area and to input a predetermined reception signal, a first transmission signal input unit arranged to input the transmission signal, a first reception signal output unit for outputting the reception signal, and a diode arranged to switch the connection between the first transmission and reception signal input and output unit and one of the first transmission signal input unit and the first reception signal output unit in accordance with a control signal;
the second switch circuit includes a second transmission and reception signal input and output unit connected to the high pass filter of the diplexer and configured to output a predetermined transmission signal of the first communication system having a transmission and reception band in a higher area and to input a predetermined reception signal, a second transmission signal input unit arranged to input the transmission signal, a second reception signal output unit arranged to output the reception signal, and a FET switch element arranged to switch the connection between the second transmission and reception signal input and output unit and one of the second transmission signal input unit and the second reception signal output unit in accordance with a control signal,
the high pass filter includes a first capacitive element connected between the antenna and the second switch circuit and a series circuit having a dielectric element and a second capacitive element, the series circuit being connected between the second switch side of the first capacitive element and the ground; and
the second capacitive element includes a ground electrode provided on a dielectric layer close to the bottom surface of the laminated body and an electrode opposing the ground electrode.

2. The high frequency module according to claim 1, wherein the diplexer is arranged to separate signals of at least four communication systems into a signal of a first communication system having a transmission and reception band in an area higher than a predetermined frequency and a signal of a second communication system having a transmission and reception band in an area lower than a predetermined frequency.

3. The high frequency module according to claim 1, wherein the FET switch element is a GaAs switch.

4. The high frequency module according to claim 1, wherein a low pass filter includes a third capacitive element and a second dielectric element, the low pass filter being provided between the diplexer and the second switch circuit.

5. The high frequency module according to claim 1, wherein a low pass filter includes a fourth capacitive element and a third dielectric element, the low pass filter being provided on the transmission signal input unit side of the second switch circuit.

6. The high frequency module according to claim 5, wherein the second dielectric element and the third dielectric element are provided in different areas when viewed from the top.

* * * * *